United States Patent [19]

Akiyama et al.

[11] 4,342,839
[45] Aug. 3, 1982

[54] METHOD OF MANUFACTURE OF ION EXCHANGE RESINS

[75] Inventors: Hiroshi Akiyama, Ichikawa; Koji Oinuma, Tokyo, both of Japan

[73] Assignee: Rohm and Haas Company, Philadelphia, Pa.

[21] Appl. No.: 132,474

[22] Filed: Mar. 19, 1980

[51] Int. Cl.³ .................. B01J 39/20; B01J 41/18; B01J 39/24; B01J 41/14

[52] U.S. Cl. ..................... 521/25; 521/28; 521/38

[58] Field of Search ................... 521/25, 38, 28

[56] References Cited

U.S. PATENT DOCUMENTS

| | | | |
|---|---|---|---|
| 2,460,516 | 2/1949 | Luáces | 521/28 |
| 3,538,020 | 11/1970 | Keskett et al. | 521/25 |
| 4,130,512 | 12/1978 | Streat | 521/38 |

FOREIGN PATENT DOCUMENTS 1537176  7/1968  France .

OTHER PUBLICATIONS

Chem. Abstracts, vol. 90, 1979, 127043e, Klemetson.
Chem. Abstracts, vol. 81, 1974, 155030f, Imobe, et al.
Vol. 90, 1979, entry 92982f, Blokhin, et al.
Vol. 76, entry 16465k, Majowski, et al.

Primary Examiner—Joseph L. Schofer
Assistant Examiner—Peter F. Kulkosky

[57] ABSTRACT

A method for the manufacture of an ion exchange resin having a granular activated carbon as the matrix thereof, comprises causing a granular activated carbon to retain therein up to about 30% by weight, based on the weight of granular activated carbon, of a polymerizable solution containing monovinyl monomers and/or polyvinyl monomers in the presence of a polymerization initiator and, optionally, an organic solvent, and allowing the mixed solution as retained in the granular activated carbon to undergo polymerization in an aqueous medium and subsequently introducing therein an ion exchange group.

10 Claims, No Drawings

METHOD OF MANUFACTURE OF ION EXCHANGE RESINS

BACKGROUND OF THE INVENTION

This invention relates to a method for the manufacture of ion exchange resins and more specifically to a method for the manufacture of ion exchange resins having a granular activated carbon as the matrix thereof.

Generally, ion exchange resins formed of monovinyl monomers or polyvinyl monomers, particularly those based on styrene, come in particle diameters usually ranging from 50 mesh (0.297 mm) to 16 mesh (1.19 mm). They are produced by first preparing granular copolymers through dispersion polymerization and introducing ion exchange groups into the resultant copolymers. According to this method of polymerization, the largest possible particle diameter in which the granular copolymers are obtained is about 14 mesh (1.41 mm). Recently, ion exchange resins referred to as "giant resins" have been prepared and have particle diameters of from 30 mesh (0.59 mm) to 16 mesh (1.19 mm). It is now, however, desriable to provide ion exchange resins having an even greater particle size diameter.

Various ion exchange resins of large particle diameters based on monovinyl monomers and/or polyvinyl monomers are disclosed in Japanese Patent Publication No. 4144/1957. A review of the publication, however, reveals that the methods taught therein are not able to readily produce ion exchange resins of uniform particle size diameters in a commercial quantity.

An object of this invention, therefore, is to provide a method for producing an ion exchange resin of a large, uniform particle diameter in commercially utilizable quantities.

DETAILED DESCRIPTION

This invention relates to a method for preparing ion exchange resins comprising the steps of treating a granular activated carbon with a mixed solution containing monovinyl monomers and/or polvinyl monomers in the presence of a polymerization initiator, allowing the mixed solution which is thereby retained in the granular activated carbon matrix to undergo polymerization and thereafter introducing a functional group onto the polymer or copolymer.

The ion exchange resin according to the present invention, combines the properties of a granular activated carbon and that of a synthetic ion exchange resin. The ion exchange resin prepared according to this invention has a uniform appearance and exhibits excellent structural stability.

A key feature of the ion exchange resins of this invention resides in the fact that the granular activated carbon retains, in the interstices thereof, the polymer formed from monovinyl monomers and/or polyvinyl monomers. This retention of the polymer is accomplished by causing the granular activated carbon to retain therein the mixed solution containing the monovinyl monomers and/or polyvinyl monomers and allowing the mixture, as retained in the granular activated carbon, to undergo polymerization.

It is important, however, that the amount of the monomer(s) to be retained in the granular activated carbon should not exceed 30% by weight of the weight of the granular activated carbon. If more than 30% by weight of the monomer(s) are retained, then the resultant product of the polymerization may suffer from structural collapse when contacted with swelling solvents. Swelling solvents are commonly encountered when functionalizing the polymer-activated carbon composition according to methods well known in the art.

The retention of the polymer in the granular activated carbon may be accomplished by immersing the granular activated carbon in the monomer solution. Additionally, the granular activated carbon may be dispersed in water or in an aqueous solution of a dispersant followed by addition of the monomers to the resultant dispersion, thereby allowing the carbon granules to absorb the monomer from the dispersion. This method is particularly advantageous when it is desired to add a small quantity of vinyl monomers to be uniformly distributed in granular activated carbon.

The granular activated carbon to be used as the matrix for the ion exchange resins of this invention may consist of a variety of forms. Selection of the granular activated carbon depends on the purpose for which the ion exchange resin finally produced is used.

One type of organic solvent which may be used can possess an ability to swell the polymer to be formed within the granular activated carbon. Examples of such organic solvents which are good swelling solvents for the resultant polymer include benzene, toluene, xylene, ethylene dichloride, tricelene and such organic solvents having a linear polymer dissolved in advance therein. Alternatively, there may be used an organic solvent in which the monomer is soluble but which is a poor swelling solvent for the resultant polymer. Examples of such organic solvents include methyl isobutyl carbinol, n-hexane, t-amyl alcohol and butanol.

The polymerization may be performed in an aqueous solution system as the polymerization temperature can be easily controlled. A dispersant may also be used as part of the aqueous polymerization system. The amount of aqueous polymerization solution used may vary widely although it is preferred that the weight be three to four times the weight of the granular activated carbon.

Examples of monovinyl monomers which may be used in practicing this invention include aromatic monovinyl monomers such as styrene, methylstryrene, ethylstyrene, and chlorostyrene and the like and aliphatic monovinyl monomers such as methyl acrylate, ethyl acrylate, butyl acrylate, methyl methacrylate, ethyl methacrylate and butyl methacrylate and the like.

Examples of polyvinyl monomers which may be used in practicing this invention include aromatic monomers such as divinyl benzene, divinyl naphthalene and trivinyl benzene and the like and aliphatic monomers such as ethylene glycol diacrylate, ethylene glycol dimethacrylate and divinyl adipate and the like.

Generally in the polymerization, a polymerization initiator is used for the purpose of causing the reaction to proceed to completion. The polymerization initiator for the present invention may be selected from among polymerization initiators which are known to one skilled in the art. Examples of such polymerization initiators include benzoyl peroxide, tertiary butyl peroxide, lauroyl peroxide, and azoisobutyronitrile and the like. Other polymerization initiators which are well known to those skilled in the art may also be used.

The polymerization temperature may vary widely. However, the polymerization temperature should be higher than the decomposition temperature of the polymerization initiator used. Under normal pressure, for example, the polymerization is carried out at a temperature in the range of from about 50° C. to about 90° C.

After polymerization within the activated carbon matrix, a functional ion exchange group may be incorporated onto the polymer in any suitable manner known in the art. One of the conventionally known methods of functionalizing is as follows. Sulfuric acid, chlorosulfonic acid or sulfur trioxide may be used for sulfonating an aromatic resin in the presence of an organic solvent capable of swelling an inner polymer to produce a cation exchange resin.

An anion exchange resin may be obtained by halomethylating the resin with chloromethyl ether or hydrochloric acid, methanol and formalin and the like and subsequently aminating the halomethylation product with an amine such as, for example, trimethyl amine, diethylethanol amine, ethylene diamine or diethylene triamine and the like.

The ion exchange resin of this invention, which is obtained by using the granular activated carbon as the matrix as described above, is uniform and capable of commercial production. The resin of this invention combines the characteristic properties inherent in any synthetic ion exchange resin and the properties of activated carbon. These ion exchange resins may be used in a variety of commercial applications.

In order to more fully illustrate the nature of this invention and the manner of practicing the same, the following examples are presented.

EXAMPLE 1

A 70-g. portion of a commercially available granular activated carbon (6 to 8 mesh in particle diameter, manufactured by Japan Carbon Co., Ltd. and marketed under the trademark "Columbia") is allowed to absorb styrene, divinyl benzene (58% in purity) and azoisobutyronitrile (as a polymerization initiator) in varying amounts indicated in Table 1 below. The imbibed granular activated carbon is stirred in 300 g. of water at 70° C. for four hours and then heated to 75° to 80° C. for one hour.

After completion of the reaction, the impregnated carbon is drained and air-dried at 80° C. for five hours.

TABLE 1

| Product No. | Styrene (g) | Divinyl Benzene (g) | Azo-iso-butyron-itrile (g) | Yield (g) |
|---|---|---|---|---|
| 1 | 6 | 1 | 0.10 | 75.6 |
| 2 | 12 | 2 | 0.14 | 80.5 |
| 3 | 18 | 3 | 0.21 | 88.9 |
| *4 | 60 | 10 | 0.7 | 108 |

*Product No. 4 is a control wherein the amount of monomers used and retained in the activated carbon matrix exceeds 30% by weight of the activated carbon used.

(A) Strong Acid Resin

To a 20-g. portion of each product of Table 1 is added, with stirring, 10 g. of ethylene dichloride and 200 g. of 98% concentrated sulfuric acid. The mixture is sulfonated at 120° C. for four hours. Upon completion of the sulfonation, the reaction mixture is thoroughly washed with water and neutralized with 10% caustic soda.

The properties of the resultant cation exchange resins are shown in Table 2.

TABLE 2

| Product No. | Ion Exch. Capacity (meq/g) | Bead Appearance | % Cracked Beads | Yield (g) |
|---|---|---|---|---|
| 1 | 0.18 | No cracks | 0 | 24.8 |
| 2 | 0.20 | " | 0 | 24.6 |
| 3 | 0.27 | " | 0 | 26.3 |
| 4(control) | 0.45 | Cracks formed | 52 | 25.3 |

(B) Strong Base Resin

In a flask, a 20-g. portion of each product of Table 1 is thoroughly stirred with 100 g. of ethylene dichloride and 50 g. of chloromethyl ether for 30 minutes. To the resultant mixture is added 10 g. of anhydrous zinc chloride and the mixture is heated at 45° C. for seven hours. Upon completion of the chloromethylation, the reaction mixture is treated with water to decompose the excess chloromethyl ether and then washed thoroughly with water. To the washed reaction mixture is added, with stirring, 20 g. of aqueous 30% trimethyl amine. The mixture is held at 50° C. for one hour and then heated to remove the ethylene dichloride (EDC) and excess trimethyl amine. The properties of the resultant resins are shown below.

TABLE 3

| Product No. | Ion Exch. Capacity (meq/g) | Water Content (%) | Bead Appearance | % Cracked Beads | Yield (g) |
|---|---|---|---|---|---|
| 1 | 0.11 | 40.5 | No cracks | 0 | 21.2 |
| 2 | 0.19 | 39.3 | " | 0 | 23.4 |
| 3 | 0.26 | 43.6 | " | 0 | 25.9 |
| 4(control) | 0.35 | 48.7 | Cracks formed | 38 | 28.5 |

EXAMPLE 2

A 70-g. portion of the same granular activated carbon used in Example 1 is allowed to absorb a solution consisting of 12 g. of styrene, 2 g. of divinyl benzene, 10 g. of methyl isobutyl-carbinol and 0.34 g. of azoisobutyronitrile. The resultant monomer-retaining granular activated carbon is then stirred in 300 g. of an aqueous 2% sodium chloride solution at 80° C. for four hours. It is then heated to remove the methyl isobutyl carbinol from the reaction mixture. Upon removal of the methyl isobutyl carbinol, the reaction mixture is drained and air-dried at 80° C. for five hours to yield 82 g. of a polymer-retaining granular activated carbon.

A 20-g. portion of this product is sulfonated by following the procedure of Example 1(A). There is consequently obtained a cation exchange resin which is found to possess an ion exchange capacity of 0.25 meq/g, contain no cracks and excel in physical properties.

Although this invention has been described in terms of certain preferred embodiments and illustrated by means of specific examples, the invention is not to be construed as limited except as set forth in the following claims.

We claim:

1. An ion exchange resin derived from vinyl monomers and having a functional group therein, said resin being disposed within the matrix of a granular activated carbon particle by polymerization of the vinyl monomers within the matrix of the particle, wherein the ion exchange resin, exclusive of said functional group, comprises up to 30% by weight of said activated carbon particle.

2. An ion exchange resin according to claim 1, wherein said resin is a cation ion exchange resin.

3. An ion exchange resin according to claim 1 wherein said resin is a sulfonated ion exchange resin.

4. An ion exchange resin according to claim 1 wherein said resin is an anion ion exchange resin.

5. An ion exchange resin according to claim 1 wherein said resin is an aminated ion exchange resin.

6. A process for preparing an ion exchange resin having a granular activated carbon as the matrix thereof comprising dispersing, within the matrix of said carbon, a polymerizable solution containing a polymerization initiator, a polymerizable monomer selected from the class consisting of monovinyl monomers and polyvinyl monomers and mixtures thereof, polymerizing said monomer within said activated carbon matrix and functionalizing the resultant polymer to form an ion exchange resin.

7. A process according to claim 6 wherein said functional group is a cationic group.

8. A process according to claim 6 wherein said resultant polymer is sulfonated.

9. A process according to claim 6 wherein said functional group is an anionic group.

10. A process according to claim 6 wherein said resultant polymer is aminated.

* * * * *